United States Patent [19]

Garwin

[11] 4,291,256
[45] Sep. 22, 1981

[54] ALIGNMENT OR CORRECTION OF ENERGY BEAM TYPE DISPLAYS

[75] Inventor: Richard L. Garwin, Scarsdale, N.Y.

[73] Assignee: International Business Machines Corporation, Armonk, N.Y.

[21] Appl. No.: 47,609

[22] Filed: Jun. 11, 1979

[51] Int. Cl.³ .................... H01J 29/70; H01J 29/76
[52] U.S. Cl. ................................. 315/368; 315/13 C
[58] Field of Search ............... 315/10, 370, 8, 13 C, 315/368; 358/10

[56] References Cited

U.S. PATENT DOCUMENTS

| | | |
|---|---|---|
| 3,723,801 | 3/1973 | Oxenham .......................... 315/13 C |
| 3,743,883 | 7/1973 | Burns . | |
| 4,001,877 | 1/1977 | Simpson ............................... 358/10 |
| 4,035,834 | 7/1977 | Drury ................................... 358/10 |
| 4,099,092 | 7/1978 | Bristow ............................... 315/10 |
| 4,159,484 | 6/1979 | Strathman .......................... 358/10 |
| 4,160,935 | 7/1979 | Groot et al. ........................ 315/10 |

Primary Examiner—Theodore M. Blum
Attorney, Agent, or Firm—Alvin J. Riddles

[57] ABSTRACT

Multiple energy beams in a display, such as a color TV tube or computer terminal, can be accurately aligned or corrected using information acquired with a photodetector having a single sensitive spot which is precisely placed on the viewing surface of the display and the display unit, in turn, is equipped to be able independently to disable, to position, and to vary the intensity of each beam.

9 Claims, 1 Drawing Figure

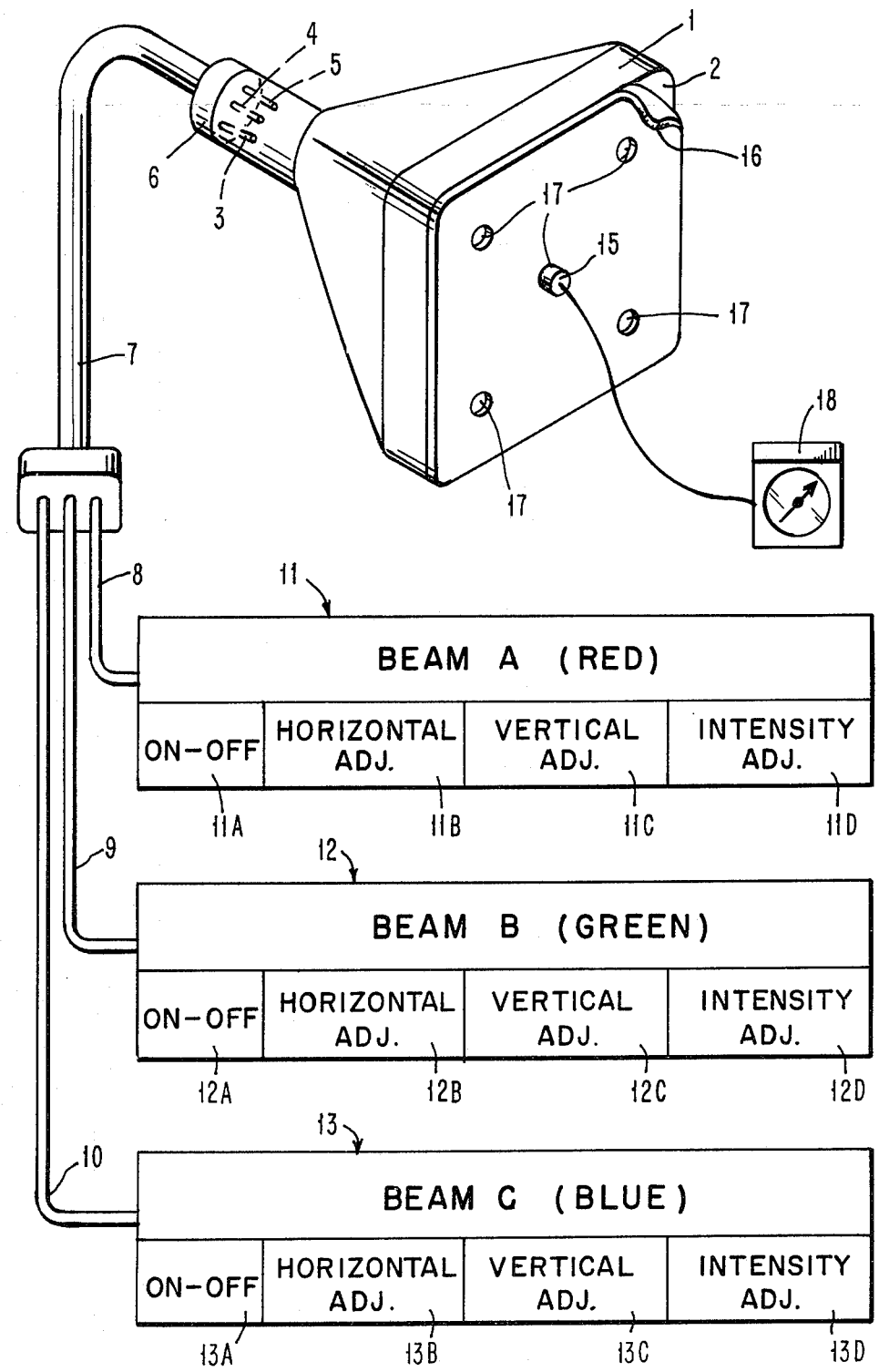

ALIGNMENT OR CORRECTION OF ENERGY BEAM TYPE DISPLAYS

DESCRIPTION

Technical Field

The technical field of the invention is the overall correction or alignment for operation as a unit, of the positioning, the intensity, and the linearity of individual energy beams with respect to each other in a display having multiple energy beams.

The typical such display is the color cathode ray tube wherein three separate beams of electrons from guns positioned and molded into the neck of a glass envelope are caused electronically to be swept across the back of a viewing area having a coating of three phosphors, each emitting a different color. The beams are swept with interrelated precision so as to converge at all points in the sweep on spots that are close together.

The trend is toward increasing the types of display devices and of the capabilities in a display. The developing displays for such applications as computer terminals are more complex than the color unit presently in use and have such features as multiple images displayed in different parts of the same viewing area.

In such future displays several colors may be used for more than one purpose. Further they may have changes in energy applied to a portion of the scan in order to enhance the emphasis of a particular piece of information being displayed. Some display structures may use glow discharge cells rather than a phosphor and the beams may originate parallel to the viewing surface with reflection onto the viewing surface in order to reduce the depth dimension.

In multiple energy beam displays, at the present state of the art, an adjustment that is made at one point on the viewing surface may operate to affect adjustments elsewhere. As a result there is a substantial quantity of time-consuming trial and error in order to get the multiple beam sources to move together all over the viewing area of the display.

The following terms describe the various display phenomena that may become involved in alignment or correction of a display unit.

The term convergence involves making each of the several beams of energy all converge on the same incremental point as that point progresses in the scan across the viewing area.

For an illustration, in the case of a color television tube, the 3 electron guns for red, blue and green are molded in position in the neck of the vacuum envelope when it is manufactured and are positioned at that time to converge generally on a single location on the back of the viewing surface where a phosphor capable of emitting all three colors is to be placed. The phosphor may be made up of 3 layers each of a different color or a single layer with different color spots in adjacent groups. The three beams sweep as a unit driven by coordinated electronic drivers through a vertical and horizontal scan over the viewing face of the tube. The term convergence thus, is the capability of the multiple beams to focus as a unit on a selected spot as the spot is moved throughout the scan.

The term intensity, is involved with the energy applied from each of the multiple beams. Again, using the color TV tube as an example, the phosphor for each individual color, red, green or blue should be equally stimulated so that one color such as the red, does not dominate. There may be a variation over the surface of the viewing area.

Intensity is also used in the case of emphasis or accentuation in the display such as would occur when a word in a passage of text is to be caused to stand out.

The term purity is used to refer to the absence of stimulation of more than one phosphor by a single beam. For example, in color, purity would refer to the absence of stimulation of the other two phosphors such as the blue and the green by the red beam.

The term linearity, is directed to the uniform scan progress over the viewing surface. The instantaneous beam position is the result of more than one component such as horizontal and vertical and the result must be uniformly incremental throughout the scan across the viewing area.

Background Art

Complex techniques have been developed in the art to get and process the needed information in order to adjust and thereby align and correct displays for problems involving convergence, intensity, purity and linearity. Most of these techniques are directed at the cathode ray tube type of display but as the art develops, flat displays involving more complex beam deflection will be appearing. In these, the linearity and convergence problems will be more difficult to solve.

Some examples of techniques to gather and process information are:

U.S. Pat. Nos. 3,723,801; 3,743,883 and 4,099,092, all of which describe taking beam position information through the face of a cathode ray tube and then, using the position information so acquired to assist; in the case of U.S. Pat. No. 3,723,801 in improving convergence, and in the case of U.S. Pat. Nos. 3,743,883 and 4,099,092 in improving linearity. Once the needed information is acquired, complex managing methods may then be employed in taking the information and converting it to correcting the problem over the viewing area of display. An example of such a method for the convergence problem in U.S. Pat. No. 4,095,137.

As may be seen from the Background Art, as the trend to more complex displays progresses, greater quantities and types of information will be needed for the adjustments for correction or alignment of the display unit.

This invention is specifically directed to a much more simplified approach to acquiring and using the information.

DESCRIPTION OF THE DRAWINGS

FIG. 1 is a schematic illustration of the elements involved in acquiring information and adjusting the energy beam type display for correction and alignment.

DISCLOSURE OF THE INVENTION

The invention involves a combination of energy sensing, using the properties of a photodetector having a single sensitive spot such as a semiconductor photosensitive device, through the viewing area of the display, and of positioning on the viewing area together with individual beam energy interrupting, intensity variation and location adjustment capabilities to obtain information that will permit the required interrelated adjustments involving convergence, intensity, purity, and linearity, to be simply and straightforwardly corrected.

The use of the properties of a photodetector having a single sensitive spot such as a semiconductor or other photoresponsive device, coupled with individual interrupting, intensity variation and location capability permit some of the properties of the display itself to be used to provide a simpler information gathering tool.

A photodetector having a single sensitive spot has the capability that, when energy from a phosphor stimulated by a beam strikes the spot, the beam deflection current, the voltage output of the photodetector or the time taken in traverse can be taken as position information.

A semiconductor photoresponsive device when used as the photodetector has the following capabilities, useful in connection with the invention that are particularly adaptable to providing the increments of information essential to adjustments for convergence intensity, and linearity of a multiple energy beam display. The semiconductor or other device has the property of being able to be stimulated by the stimulated emission frequency of a particular frequency phosphor. Further, the ability to respond to energy of a particular frequency such as from a particular color phosphor can be provided by the photodetector itself or by a simple lens system on the photosensitive device that focuses it at a particular layer on the other side of the viewing area 2. It has the property of being focusable on a particular emitting location in a phosphor, it can indicate relative intensity of the stimulated emission and it has a physical size such that relocation and registration for a large number of information points can be readily accomplished.

This last property permits the use of an overlay on the viewing area. The overlay is equipped with precise sensor locating holes. With this arrangement adjustment is accomplished with electrical indication using the relative intensity indicating property of the photoresponsive device. Movement from one precise registration point to another is merely done by manually moving the semiconductor photoresponsive device.

With these capabilities, and the ability individually to interrupt, vary intensity and to vary the location of each beam so that only a simple beam or selected combination less than all that are to receive adjustment are included in the measurement. All the needed information is thus simply acquired and the adjustments directly made for full display performance correction and alignment.

Best Mode For Carrying Out The Invention

Referring to the Figure. A display member 1 shown as a cathode ray tube having a viewing surface 2 is provided. While for purposes of illustration, a typical color-television-type multiple-electron gun cathode ray-type tube 1 is shown, as will be apparent to one skilled in the art in the light of the principles of the invention to be set forth, displays of various types and complexities may be adjusted for alignment and corrected. The tube 1 has several energy beams emanating from guns labelled 3, 4 and 5 which are of fixed construction in this illustration, being molded into the neck 6 of the evacuated glass envelope. Each beam operates to stimulate a phosphor color in the additive primary colors of either red, green or blue from a phosphor coating on the back of the surface 2. The color display in turn is then observable from the front of surface 2.

A cable 7 is connected to the neck 6. The cable 7 transmits power to the guns 3, 4 and 5 and transmits scan driving energy to produce the horizontal and vertical sweep. The cable 7 has branch cables 8, 9 and 10, respectively, connected to beam power supply and control assemblies 11, 12 and 13, each labelled for purposes of discussion for the three colors; red, green and blue.

Since the energy beam guns 3, 4 and 5 are fixed in position in manufacturing operations of the glass envelope and in operation, each beam movement and intensity is governed by electronic circuitry, which in turn is made up of electronic components each with its own variations and non-linearities in performance, it will be desirable, depending on the application, to be able to acquire position and intensity information for each beam and combinations thereof over many points of the viewing surface 2 so that the many adjustments and compromise settings can be made to provide a corrected and aligned display over the entire viewing surface.

To accomplish this in accordance with the invention, a photodetector having a single sensitive spot such as a semiconductor photoresponsive device 15 is positioned sequentially in precise locations over the viewing surface 2 and information acquired and adjustments made at each. The semiconductor photoresponsive device is located by placing an overlay over the viewing surface 2 and positioning the photoresponsive device 15 in the openings 17 therein. The overlay 16 is fabricated with as many openings 17 as may be desired for the type of display. For example, for a simple 3 gun color tube, the center and a few peripheral points may be sufficient, whereas for a viewing area where there are several separate items being displayed from highly non-linear guns such as may be constructed in flat displays, many points will be required.

While the photoresponsive device 15 positioning capability 16 is shown as a flexible overlay or foil 16, it is also possible to build into the beam control assemblies 11, 12 and 13 a test pattern capability that would place a design on the face 2 on which the device 15 may be positioned.

In accordance with the invention the information sensing detail will vary with the operation being performed. For example, since many points are necessary for linearity, the registration facility of the overlay 16 is more essential than for a few points such as simple convergence where a generated pattern may suffice.

Once the beam is being sensed by the device 15, the property of the photodetector having a single sensitive spot such as a semiconducting photoresponsive device 15 to sense intensity and to so indicate on a meter 18 or to provide an optical signal or a signal for further processing, may be employed by maximum indication to precisely determine the location of the beam. The ability to sense intensity is also employed when it is desired to verify that identical or added power is applied. Several beams must be identical in color applications or when emphasis is to be given a word of text in context such as: energy BEAM type. Thus the device 15 has the property to indicate a quantification of the energy sensed which is useful for positioning information and for intensity information.

The output of device 15 when stimulated by a beam may also be correlated with beam drive current or voltage or time of traverse as an indication of position.

Each beam control assembly member 11, 12 and 13, is equipped with a capability to turn the beam "on" and "off" labelled 11A, 12A and 13A, respectively, a horizontal adjustment capability labelled 11B, 12B and 13B, respectively, a vertical adjustment capability labelled 11C, 12C and 13C, respectively, and an intensity adjustment labelled 11D, 12D and 13D, respectively.

The information gained from the properties of the device 15 may be communicated to a technician usually with a meter 18. Although in simple adjustment a light would suffice if line adjustment or intensity were not critical.

The meter 18 indicates the presence of energy at a particular spot and coupled with the "on", "off" and adjustment capability for each beam it is now possible to accurately know which beam is providing the energy, precisely where and how intense that energy is and then to move that beam from one point to another.

The display as a unit may have such items as deflection corrected by providing programmed patterns such as lines and crosses for visual and photodetector use.

For instance, to calibrate the horizontal deflection a horizontal scanning line could be moved slowly vertically until it coincided, as indicated at 18, with the center of the sensitive spot of the device 15. Similarly to calibrate the vertical deflection a vertically scanning line would be moved horizontally slowly until it coincided, as indicated at 18, with the center of the sensitive spot of the device 15.

The adjustment involved in the beam controllers 11, 12 and 13 will vary with the complexity of the display that is to appear on surface 2. Where simple color is involved and it is desired to solve the convergence and intensity problem at each of the spots, the adjustment is merely an adjustment that is set in the control assemblies 11, 12 and 13 to position the energy from each gun 3, 4 and 5 to converge on a specific adjacent area as that area is moved throughout the scan. Where linearity is involved, the adjustment is much more complex and generally a table is set into a READ ONLY type of memory in a microprocessor wherein deflection increment signals acquired by recording the information at many points by mounting the device 15 via the holes 17 in the overlay 16. As the scanning of the display progresses, the travel is correlated with addresses that correspond with individual points in the travel. The microprocessor provides a table lookup operation that results in an algebraically incremental signal to be added to the drive signal at that point.

In the case of the 3 gun color TV example for overall alignment or correction, the three energy beams must converge on the same adjacent area, stay in the same relationship as that spot sized area moves throughout the scan over the viewing face 2 and each beam must deliver the same amount of energy to the phosphor at all points of the scan so that the color picture quality stays constant over the entire surface 2.

The device 15 is positioned in one opening 17 of the overlay 16. Two of the beams would be turned "off", for example, by turning "off" switches 12A and 13A. The remaining (blue) beam would be positioned using 13B and 13C to bring it under the photoresponsive device 15. The adjustments 13B and 13C are then used to establish a maximum reading on meter 18. It is well at this point to record the maximum reading for intensity comparison with later beam adjustments. Switch 13A is turned "off" and switch 12A is turned "on" so that the green beam can now be visually brought under the device 15 by adjustments 12B and 12C and then precisely positioned by moving until maximum is reached on meter 18. Once the maximum is reached if that maximum is different from that previously recorded for the blue beam, the intensity adjustments 13D or 12D can be adjusted to cause both beams to reach the same value. The green beam is then also turned "off" by switch 12A and the red beam turned "on" using switch 11A where the procedure with the two previous beams is repeated. At this point all three beams are converging on the same spot sized area with equal intensity. The procedure is repeated for each opening 17 in the overlay 16.

It will be apparent in the light of the principles set forth that many processing variations may be employed depending on the complexity of what is being done and how often it is to be done. For example, feedback can be employed to position the beam without human intervention.

There may be instances where an adjustment at a peripheral position will alter the setting beyond tolerance at another position and a compromise must be effected. In each instance the combination of the locating means with the photoresponsive means in the indicator is a quick accurate method of reaching an acceptable compromise. In the case of color purity the same technique as for convergence takes place, but here the ability of the photoresponsive member 15 to measure not only the presence or absence of the beam but also the intensity through meter 18 is of value to permit an even intensity, a cross-stimulation of other phosphors, or an enhanced intensity in the case of emphasis to be established.

With respect to the matter of linearity, this adjustment involves a large number of holes of the type of 17. The number of holes 17 is selected to provide a sufficient number of increments over the viewing area. The proper positioning over the surface is assured for both vertical and horizontal scan since the positioning is merely the insertion of the device 15 in the prepunched holes 17 of the peripherally registered overlay 16. In this instance there will be + and − electronic increments of information that will be indicated through the indicator 18 and set into a standard table lookup apparatus correlated with the scan.

One general method for doing this is to set up an address table correlated with the scan. The + or − increments are entered into a microprocessor at corresponding addresses. The necessary incremental voltages needed to be added to either the ramp or square wave signal drive for the precise position as the scan progresses, are looked up and the increment is added to the signal drive at the proper point.

What has been described is the use of a photodetector with a single sensitive spot as a sensor coupled with the use of some of the capabilities of the display being adjusted to provide information of sufficient quantity in a sufficiently simple manner that the various interrelated complexities of display correction and alignment may be simply and reliably accomplished.

We claim:

1. In the process of correction or alignment of a display of the type where multiple electronically driven independent energy source beams interact at a plurality of closely adjacent display spots on a viewing surface the improvement performable at at least one of a plurality of locations over said viewing surface comprising the steps of:

identifying an accurately positioned location on the viewing surface of said display;

positioning a photodetector adapted for sensing of the order of only a single display spot out of said plurality of closely adjacent display spots at said identified location on said viewing surface;

directing the position of a first of said energy source beams to said photodetector while simultaneously disabling each remaining said energy source beam and thereafter serially directing the position of each remaining said energy source beam individually to said photodetector while simultaneously disabling each other said energy source beam.

2. The process of claim 1 wherein said photodetector is a semiconductor photodiode.

3. The improvement of claim 1 wherein said accurately positioned locations are established by a flexible member in contact with the surface of said viewing area and peripherally registered with the edges of the viewing area and containing prepunched photodetector locating holes at predetermined locations.

4. The process of correction of the interrelationship of multiple individual beams of energy that are adjustably electronically swept to scan over and interact at a plurality of closely adjacent display spots on a viewing surface comprising performing at at least one of a plurality of selected locations over said viewing surface the steps of:

positioning a photodetector adapted for sensing of the order of only a single display spot out of said plurality of closely adjacent display spots at a selected location on said viewing surface;

powering and positioning a first beam only at said selected location at a selected intensity as indicated by said photodetector; and powering and positioning each subsequent beam at said selected location and adjusting beam interaction on said viewing surface in relation to said selected intensity at said selected location.

5. The process of claim 4 wherein said photodetector having a single sensitive spot is a semiconductor is a photodiode.

6. The process of claim 5 wherein said positioning involves a flexible member in contact with said viewing surface and peripherally registered with the edges of said viewing surface with photodiode locating holes.

7. The process of claim 6 wherein said display is a three beam color cathode ray tube.

8. The process of claim 6 wherein at least one of position and intensity signal values to be algebraically added to the signals for the electronic sweep at each said selected location are tabulated at an address for algebraic addition when the sweep reaches that address.

9. The process of correction or alignment of a display of the type having multiple individual beams of energy that are electronically swept to scan over and interact at a plurality of closely adjacent display spots on a viewing surface comprising in combination performing at at least one of a plurality of locations over said viewing surface the steps of:

providing photodetector sensing capability adapted for sensing of the order of only a single display spot out of a plurality of closely adjacent display spots;

providing accurate photodetector positioning capability on said viewing surface permitting sensing of the order of a single display spot out of said plurality of closely adjacent display spots;

providing disabling capability for each said individual energy beam;

providing at least one of positioning and intensity adjustment capability for each said individual energy beam or combination thereof; and employing said sensing capability said positioning and said intensity beam adjustment capabilities in combination with said beam disabling capability to correct at least one of power and location of each beam at each selected position location.

* * * * *